(12) United States Patent
Andreae, Jr. et al.

(10) Patent No.: US 6,276,470 B1
(45) Date of Patent: Aug. 21, 2001

(54) POWER ASSISTED ADAPTER FOR PULL TYPE GOLF CLUB BAG CARRYING CARTS

(75) Inventors: Fred N. Andreae, Jr., Fort Gratiot, MI (US); James F. Andreae, Costa Mesa, CA (US)

(73) Assignee: Cart Buddy, Inc., Fort Gratiot, MI (US)

( * ) Notice: Subject to any disclaimer, the term of this patent is extended or adjusted under 35 U.S.C. 154(b) by 0 days.

(21) Appl. No.: 09/427,416

(22) Filed: Oct. 27, 1999

Related U.S. Application Data

(60) Provisional application No. 60/106,852, filed on Nov. 3, 1998.

(51) Int. Cl.[7] ................................................ B62D 51/04
(52) U.S. Cl. .................... 180/19.3; 180/11; 280/DIG. 5
(58) Field of Search .................. 180/11, 19.1, 19.2, 180/19.3, 65.1; 280/DIG. 5, DIG. 6

(56) References Cited

U.S. PATENT DOCUMENTS

| | | | |
|---|---|---|---|
| 2,962,106 | * 11/1960 | Burnside et al. | |
| 3,247,923 | * 4/1966 | Cornell | |
| 3,330,371 | * 7/1967 | Seaman | |
| 3,583,510 | * 6/1971 | Hastings | 180/11 |
| 4,019,597 | 4/1977 | Carmichael | 180/11 |
| 4,063,612 | 12/1977 | Weiss | 180/19.2 |
| 4,106,583 | 8/1978 | Nemeth | 180/65.6 |
| 4,848,504 | * 7/1989 | Olson | 180/191 |
| 4,878,554 | * 11/1989 | Dion | 180/19.3 |
| 5,167,389 | 12/1992 | Reimers | 248/96 |
| 5,232,065 | 8/1993 | Cotton | 180/11 |
| 5,547,035 | * 8/1996 | Berry | 180/19.2 |
| 5,685,385 | 11/1997 | Sanuga | 180/65.1 |
| 5,749,424 | 5/1998 | Reimers | 180/19.2 |
| 5,860,485 | * 1/1999 | Ebbenga | 180/19.2 |
| 5,899,284 | * 5/1999 | Reimers et al. | 180/11 |

OTHER PUBLICATIONS

Cart Buddy, Inc., "Cart Buddy—It'll change the way you play the game," ca. 1998.
Caddymax, "Where Comfort Begins."
Paradigm Sports, "ClubRunner Caddie," 1995.
SunMountain Sports Technologies, "Dynamis, Twenty–first Century Caddy."
Hill Billy USA, "Hill Billy . . . I want to walk with you!" 1997.
Kangaroo Golf Ltd., "Kangaroo Cadet," 1993.
PowaKaddy International Ltd., "On Course for Action—PowaKaddy."
Pinehill Innovators Ltd., et al., "Pinehill Caddy," fliers.
Wheel Power International Ltd., "It'll Change the Way You Play—ROBO–KADDY," flier.
Theima Technology, "The Robotic Golf Cart . . . ROB-O–CART."

* cited by examiner

*Primary Examiner*—Paul N. Dickson
*Assistant Examiner*—Avraham H. Lerner
(74) *Attorney, Agent, or Firm*—Christopher John Rudy

(57) ABSTRACT

Power assisted pull cart adapter unit is useful for converting a standard golf club bag pull cart into a power assisted golf club bag cart. The adapter unit can include (1) a frame including a vertical arm having upper and lower ends; and, directly or indirectly pivotally attached to the vertical arm below its upper end, a lower arm having a proximal end which is so attached to the vertical arm and a distal end; an upper clamping mechanism for securing an upper portion of a frame of the golf club bag pull cart, which is attached about the upper end of the vertical arm; a lower clamping mechanism for securing a lower portion of the frame of the golf club bag pull cart, which is attached about the distal end of the vertical arm and which can pivot with respect to the lower arm; (2) a power unit attached to the frame; (3) a wheel set having an axle, attached to the frame and drivable by the power unit; and (4) a power unit controller in communication with the power unit. The unit may be powered by electrical power from a battery.

20 Claims, 4 Drawing Sheets

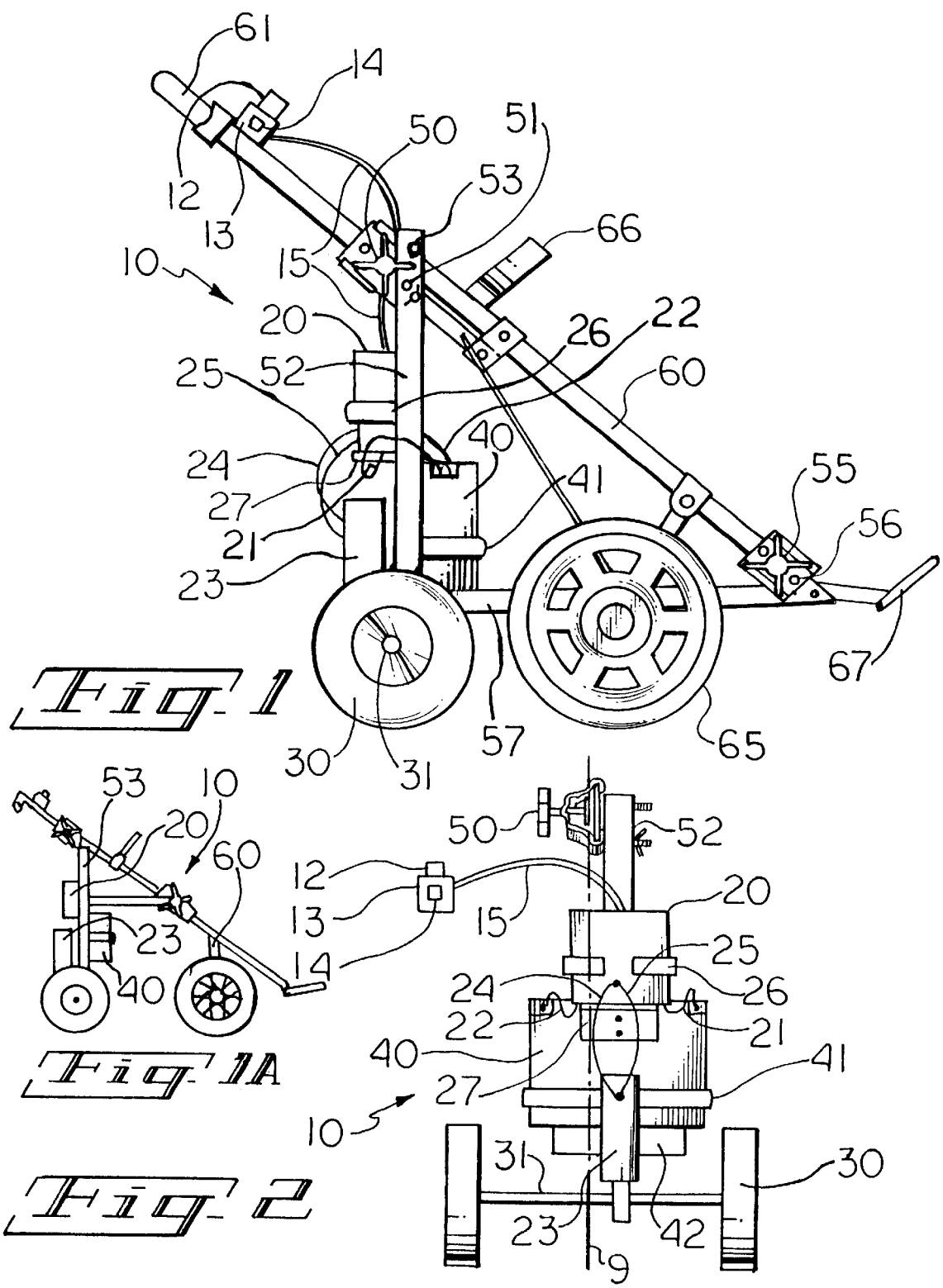

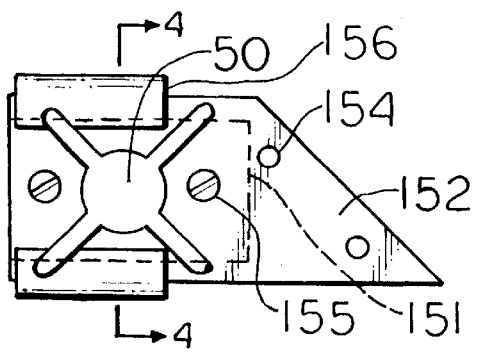
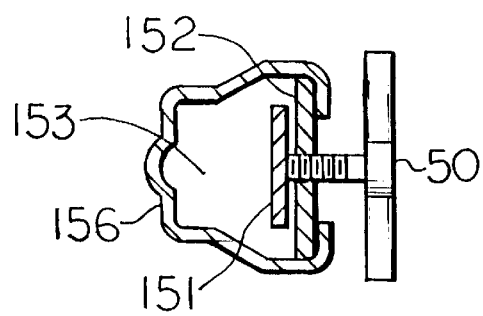
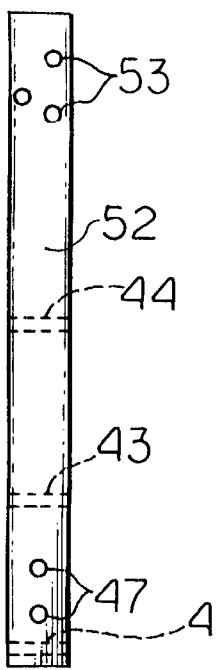
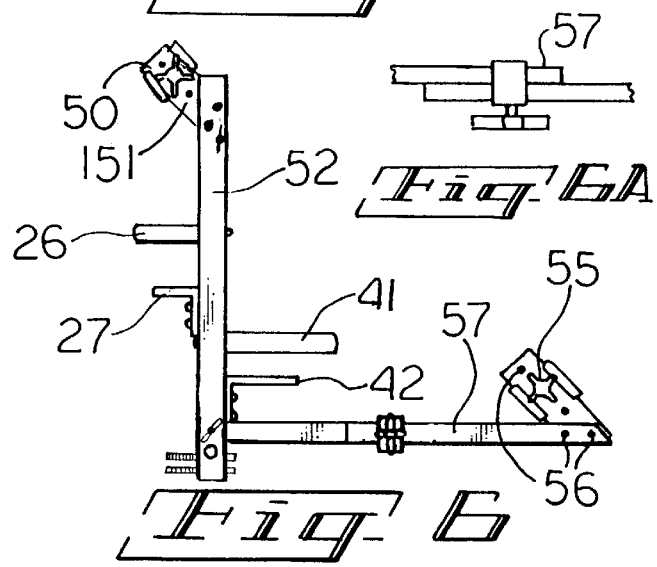
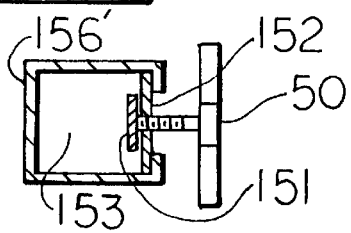
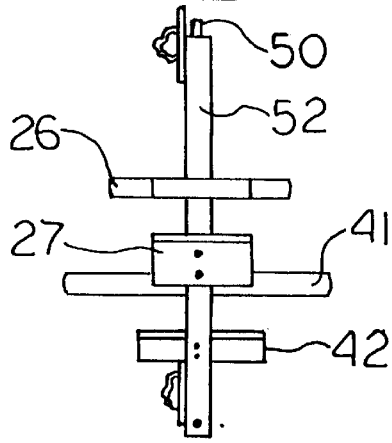

POWER ASSISTED ADAPTER FOR PULL TYPE GOLF CLUB BAG CARRYING CARTS

CROSS-REFERENCE CLAIM OF PRIORITY

This claims the benefit under 35 USC 119(e) of provisional application No. 60/106,852 filed on Nov. 3, 1998. The complete specification of that provisional application is incorporated herein by reference.

FIELD OF THE INVENTION

The present invention concerns a power assisted pull type cart useful for carrying a golf club bag. In a particular embodiment or subcombination, it concerns an electric motor power assisted adaptation for attachment to the pull type cart.

BACKGROUND TO THE INVENTION

Among motorized golf carts, the individual pull cart type has several advantages over its larger, two-person-carrying cousin, among these being its ability for the individual golfer to move it only to where his ball is to be played, and not have to waste time going to where the other golfer must play his ball. Various motorized pull type carts are known. Among these are two-wheeled and one-wheeled cart adapters which convert the pull type cart into a motor-powered golf club cart. See generally, U.S. Pat. Nos. 5,749,424; 5,685,385; 5,232,065; 5,167,389; 4,106,583; 4,063,612; 4,019,597; and the CART BUDDY pull cart adapter flier. Other motorized golf carts are also known. See, e.g., materials on CaddyMax cart; ClubRunner caddie; Dynamis caddy; Hill Billy trolley; Kangaroo Cadet motorcaddie; PowaKaddy cart; Pinehill caddy, including Ease-E-caddy cart; Robo-Kaddy cart. See also, materials on Robo-Cart robotic golf cart.

It would be desirable to improve upon the foregoing.

SUMMARY OF THE INVENTION

The present invention provides a motor power assisted pull cart adapter unit useful for converting a standard golf club bag pull cart into a motor power assisted golf club bag cart. In general, a vertical and a horizontal (lower) arm are secured, and may pivot, and an attached power unit can drive a set of drive wheels. Cart attachment is by upper and distal ends of the arms.

The invention is useful in enhancing the game of golf.

By the invention, the art of motor power assisted pull type golf club bag carrying carts is significantly advanced. The unit is strong, lightweight, adaptable to many varieties of pull type golf club bag carrying carts, and practical to make and use. It is, moreover, in a form convenient for easy shipping.

Numerous further advantages attend the invention.

BRIEF DESCRIPTION OF THE DRAWINGS

The drawings form part of the specification hereof. With respect to the drawings, the following is briefly noted:

FIG. 1 is a side view of a motor power assisted pull type golf club bag carrying cart of the invention, composed of a standard pull type cart and a motor power assisted pull cart adapter unit hereof.

FIG. 1A is a plan view of another embodiment of the invention having its lower support bar of its adapter frame disposed in an elevated position.

FIG. 2 is a front view of the cart ensemble of FIG. 1.

FIG. 3 is a side view of a clamping device of the adapter unit depicted in FIGS. 1 & 2.

FIG. 4 is a sectional view of the device depicted in detail in FIG. 3, taken along 4—4 of FIG. 3.

FIG. 4A is a sectional view of an alternate, preferred embodiment of the device depicted in detail in FIG. 3, also taken along 4—4, of FIG. 3.

FIG. 5 is a side plan view of a vertical support bar found within the frame of the adapter unit depicted in FIGS. 1 & 2.

FIG. 6 is a side view of the frame of the adapter unit depicted in FIGS. 1 & 2.

FIG. 6A is a top view of a portion of the lower member of the frame depicted in FIG. 6, showing a clamp-fastened joint thereof.

FIG. 7 is a front view of the frame depicted in FIG. 6.

ILLUSTRATIVE DETAIL OF THE INVENTION

The invention can be further understood by the present detail which may be read in view of the drawings. The same is to be taken in an illustrative and not necessarily limiting sense.

Figure 8:
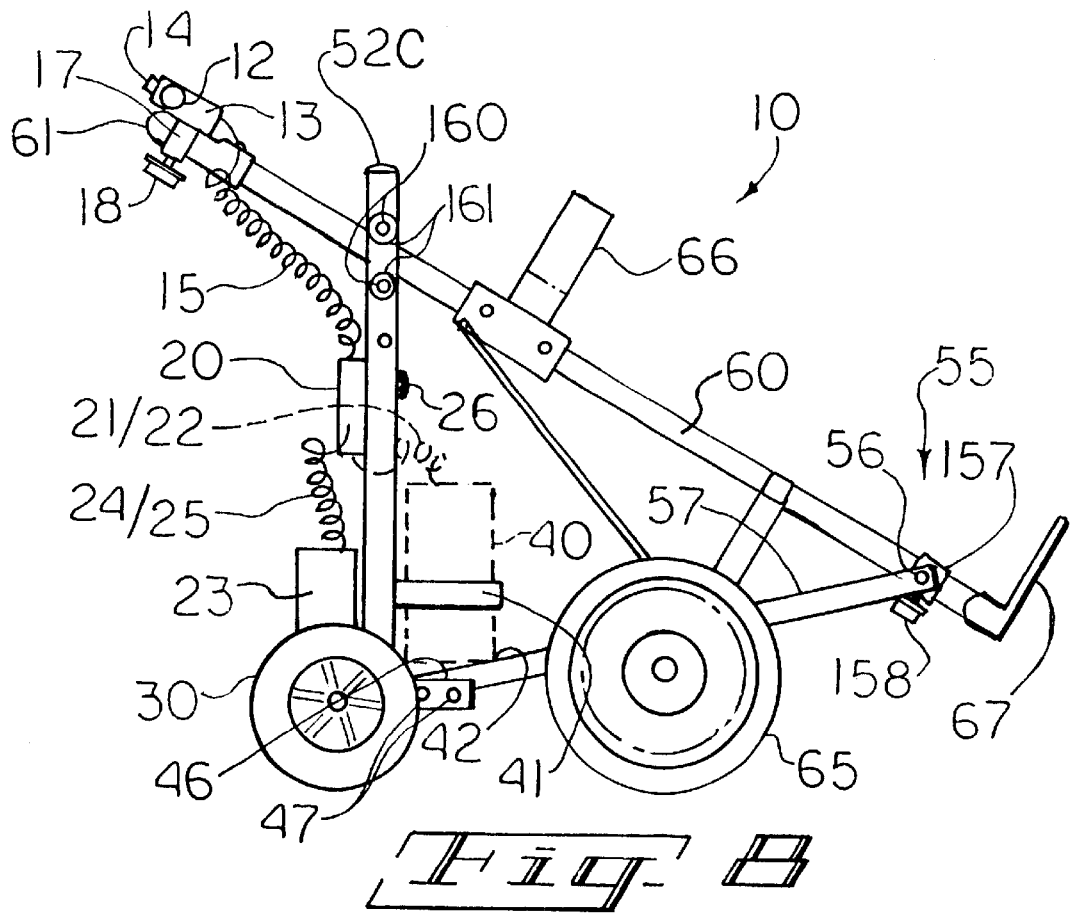
FIG. 8 is a side view of another embodiment of the invention, composed of a standard pull type cart and a more preferred motor power assisted pull cart adapter unit hereof.
Figure 10:
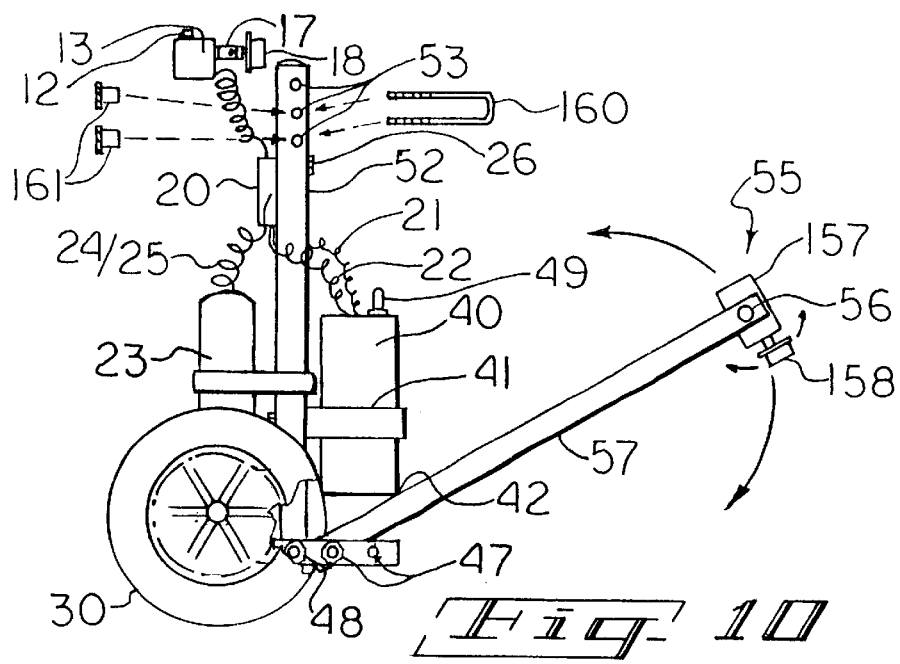
FIG. 10 is a side view of an adapter unit as in FIGS. 8 & 9.

With respect to the drawings, central axis 9 is depicted (FIG. 2) about which motor power assisted pull type golf club bag carrying cart 10 is generally constructed. The cart 10 and its adapter (FIGS. 1, 1A & 2; and 8 & 9) and its components (FIGS. 3, 4, 4A, 5, 6, 6A & 7; and 10–14) can include the following features, even though all of the features listed are not necessarily found in every cart 10;

| Feature Set | Number | Indentity |
| --- | --- | --- |
| Speed control mechanisms | 12 | Speed controller dial |
| | 13 | Speed control box |
| | 14 | On/off switch |
| | 15 | Wires from box 13 to box 20 |
| | 16 | Power indicator indicia, e.g., lights |
| | 17 | Speed control clamping frame |
| | 18 | Speed control clamping screw. |
| Controller box and motor | 20 | Controller member (box) |
| | 21 | Positive battery cable |
| | 22 | Negative battery cable |
| | 23 | Electric drive motor |
| | 24, 25 | Wires connecting controller box 20 and motor 23 |
| | 26 | Fastener for controller box 20 which may be immovable and may include a support (27), or which may be of the pivoting type for ease of attaching the wires 24, 25 (FIGS. 8, 10) |
| | 27 | Bottom support for the box 20. |

-continued

Figure 9:
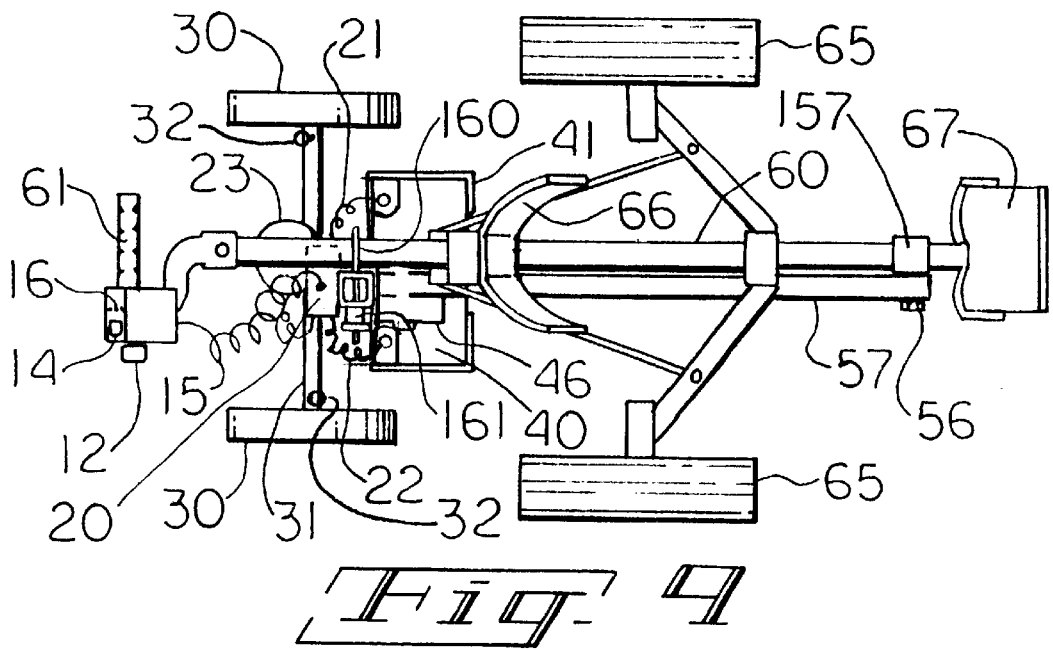
FIG. 9 is a top view of the cart ensemble of FIG. 8.
Figures 11, 12:
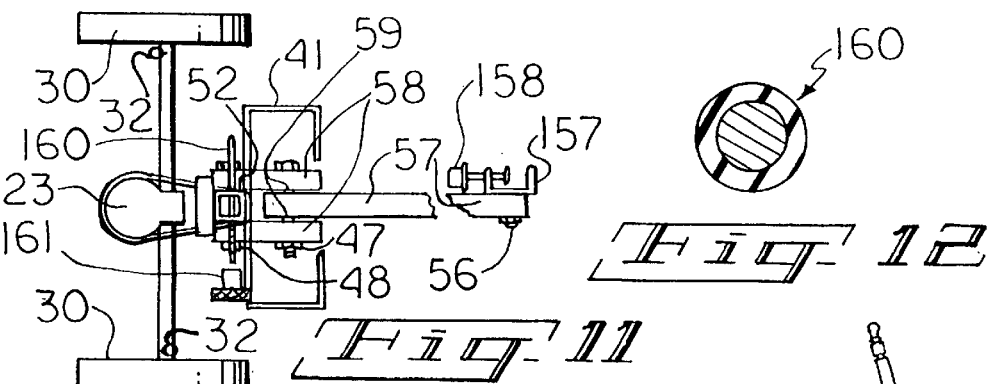
FIG. 11 is a top view of the adapter unit of FIG. 10, with certain of its components removed.
FIG. 12 is a sectional view of a rubber-coated U-bolt found in the cart as of FIGS. 8–11, taken along 12—12 in FIG. 13.
Figure 13:
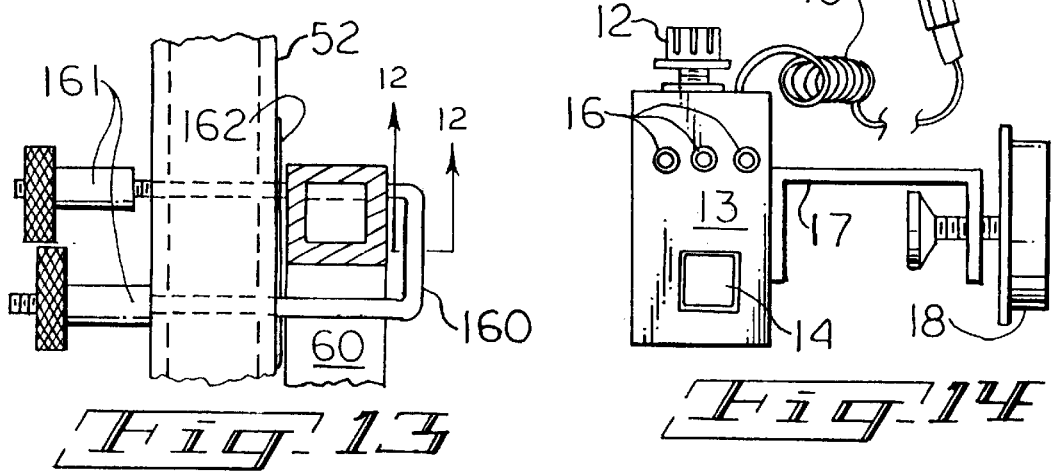
FIG. 13 is a front view of a top connector assembly of the cart as of FIGS. 8–11, taken, however, as a mirror image thereof.
Figure 14:
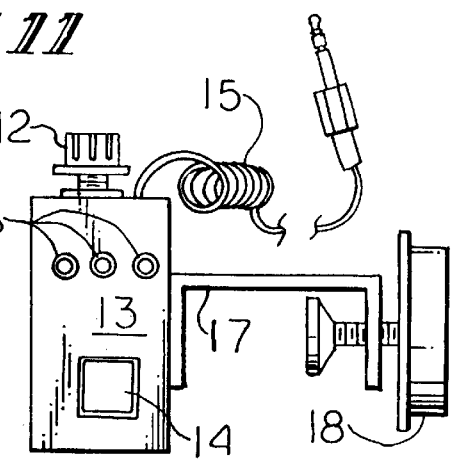
FIG. 14 is a plan view of a speed control mechanism found in the cart as of FIGS. 8–11.

| Feature Set | Number | Indentity |
|---|---|---|
| Wheels and axle assembly | 30 | Drive wheels |
| | 31 | Drive axle |
| | 32 | Cotterless pins, which may be pulled to disengage wheels 30 from the drive unit 23, say, if power to it is depleted, so reducing drag in such a case. |
| Power reservoir with bar | 40 | Direct current battery |
| | 41 | Battery clamp |
| | 42 | Bottom support for battery 40, which may be provided as such (FIGS. 2, 6A, 7) or by resting on lower arm 57 (FIGS. 8, 10) |
| | 43 | Bolt hole for the support 42 to connect with support bar 52 |
| | 44 | Bolt hole for the support 20 to connect with support bar 52 |
| | 45 | Motor mount hole |
| | 46 | Welded/monolithically formed intermediate mounts connected to vertical arm 52 to connect vertical and pivoting horizontal arms 52, 57 by by pins/bolts through holes 47 (FIGS. 8, 9) |
| | 47 | Pin/bolt holes to adjustably mount lower support bar 57 |
| | 48 | Hole and/or bolt/pin assembly connecting vertical bar 52 with intermediate mounts 58 |
| | 49 | Battery handle. |
| Main frame and adjusters | 50 | Adjustable top clamp for attachment of golf cart 60 |
| | 51 | Screws for top clamp 50 |
| | 52 | Vertical support bar |
| | 52c | Tube cap. |
| | 53 | Upper adjusting/aligning holes |
| | 54 | Lower adjusting/aligning holes |
| | 55 | Adjustable bottom clamp for attachment of golf cart 60 |
| | 56 | Screw(s) for bottom clamp 55 |
| | 57 | Lower support bar attachable to cart 60 through clamp 55 |
| | 58 | Pinned/screwed intermediate mounts connected to arm 52 to connect vertical and pivoting horizontal arms 52, 57 by by pins/bolts through holes 47 (FIGS. 10, 11) |
| | 59 | Bushings. |
| Golf pull cart, attached | 60 | Pull type golf bag cart frame |
| | 61 | Golf cart handle |
| | 65 | Golf cart wheels |
| | 66 | Bag support, top |
| | 67 | Bag support, bottom. |
| Clamp units, upper/lower | 151 | Upper clamp plate, inside |
| | 152 | Upper clamp plate, outside |
| | 153 | Volume for golf cart frame |
| | 154 | Holes for fastening clamp to the vertical support bar 52 |
| | 155 | Screws |
| | 156 | Upper lamp outer housing |
| | 156' | Another clamp outer housing. |
| | 157 | Preferred, rubber-coated lower clamp frame, may be same as 17 |
| | 158 | Clamp screw for frame 157 (may be same as 18) |
| | 160 | Preferred rubber-coated square U-bolt clamp to secure cart 60 |
| | 161 | Preferred, knurled hand nuts to tighten up the clamp 160 |
| | 162 | Soft coating, e.g., a rubber, on upper bar 52 by holes 53 to protect golf cart frame 60. |

In general, the adapter of the invention as depicted is adjustable, and may be made to be further adjustable. In a preferred embodiment, the controller box 20 is pivotally mounted with pivoting bolt or pin 26, which, as indicated previously, can be swung from side to side to ease the attachment of the wires 24, 25. A series of holes from which one may select alternatives may be employed to effect adjustability, for example, such as the several holes 47, 53 and/or 154 (FIGS. 1, 3, 5, 6; 8 & 10). One or two sets of the lower holes 47 and three or so upper holes 53 are beneficially employed in a more preferred cart (FIGS. 8–13). Other holes and/or slots may be provided for sliding or alternative mounting locations. For example, the holes depicted on the cart-clamping end of the lower support bar 57 (FIGS. 1, 5 & 6) may be provided as a slot to provide for slidably adjusting of the lower support bar 57. The clamp(s) may pivot. For example, the clamp 55 may pivot to accommodate the cart having its frame 60. As well, for example, the lower support bar 57 may be made to be adjustable by providing it in two side-by-side pieces, one with a slot and the other with holes for insertion of a fastener such as a bolt of a nut and bolt combination. A preferred alternative, however, is provision of two side-by-side, slidable portions of the support bar, securely connectable at the desired length with a clamp (FIG. 6A). More preferable, however, is provision of the intermediate mounts 46 or 58 (FIGS. 8–11) attached to the vertical bar 52, and to which a pivotable lower arm or bar 57 is attached, advantageously with pins, bolts or the like through the holes 47. With an arrangement such as provided by employment of the intermediate mount 46, 57, the cart adapter unit when attached to a cart through its frame 60 is centered well, ameliorating or negating any side to side pull of the same when motive power is applied; the lower arm 57 can be employed as a battery support 42, and the adapter unit can be folded up compactly for shipment, say, in multiple units, or for storage.

Suitable fasteners such as threaded rods; screws; wing nuts; pins to include cotter pins, cotterless pins, straight pins, spring-and-ball pins for detent fixation; and so forth and the like may be employed in assembling the invention, as well as may be bending, cutting, welding, gluing, and so forth and the like. The provision of screws, hand-turnable handles, and cotter and cotterless pins is especially helpful in the assembly of the invention on site, for example, from a kit.

The adapter and its components can be made of any suitable material, to include metal. For example, the axle 31 may be made of steel rod; the vertical support bar 52 made of hollow aluminum box stock, and the lower (horizontal) support bar 57 may be made of solid aluminum bar stock, and the supports and clamps made of aluminum or steel. Beneficially, the adapter is made with arms 52, 57 and/or mounts 46/58 of square cross-section aluminum tubing, say, with arm 52 of 1¼-inch cross-section and arm and mounts 57, 58 of ¾-inch cross-section (FIGS. 8–13); therein, bushings or spacers 59 are typically employed to take up the net ½-inch space between the arm and mounts 57, 58. Suitable plastic and/or wood may be employed. The battery, controllers, wires, motor may be commercially obtained, as well as may be drive wheels, structural components, handles, fasteners to include clamps, screws, cotter and cotterless pins, and so forth and the like. A component of the invention which is not directly commercially obtainable can be made by methods known to any person skilled in the pertinent art. For example, the clamp outer housing 156 (FIG. 4) may be made of metal by stamping, and the preferred clamp outer housing 156' (FIG. 4A) may be made readily from standard ⅞-inch square inside width metal box stock, cut to a suitable length, say, a 2-inch or so length, and cut to have an open, lengthwise slot or otherwise be provided with a suitable orifice for access for the threaded handle shaft of the clamp 50. Of course, in the latter case, the size of the plate 152 is changed accordingly to accommodate the housing 156'. As indicated previously, the clamps 55 may be in the form of clamp frame 157 and screw 158, and these may be purchased or made to be the same as the frame, screw clamp combination 17, 18. For example, the clamp frames 17, 157 and tips of screws 18, 158 may be rubber coated or the like to minimize scratching when engaged.

Assembly and operation of the invention can be accomplished by any person skilled in the art. As well, any of a number of substitutions for the constructs and materials referenced above can be made by the skilled artisan.

The present invention has numerous advantages, to include over known other art. A number of these are listed as follows:

- The invention is readily adaptable to many commercially available golf pull carts, including ¾×¾-inch and 1¼×¾ inch squared tube frame varieties.
- It is strong, lightweight and compact.
- It is highly portable, and easily shippable.
- Assembly and disassembly is readily carried out.
- Assembled units can remain securely assembled.
- Exposed chains and sprockets are avoided.
- Operation of the assembled cart is easy.
- Freewheeling operation can lessen drag from an inoperative motor, conserving a player's energy in such a situation.
- It can be economically provided.

CONCLUSION

The present invention is thus provided. Various features, components, subcombinations and combinations may be practiced with or without reference to other features, components, subcombinations or combinations in the practice of the invention, and numerous adaptations and modifications can be effected within its spirit, the literal claim scope of which is particularly pointed out as follows.

We claim:

1. A power assisted pull cart adapter unit useful for converting a standard golf club bag pull cart into a power assisted golf club bag cart, said unit comprising a frame including a vertical arm having upper and lower ends; and, adjustably attached to the vertical arm below its upper end, a lower arm having a proximal end which is so attached to the vertical arm and a distal end; an upper clamping mechanism for securing an upper portion of a frame of the golf club bag pull cart, which is attached about the upper end of the vertical arm; a lower clamping mechanism for securing a lower portion of the frame of the golf club bag pull cart, which is attached about the distal end of the lower arm and which can adjust with respect to the lower arm;

a power drive unit attached to the frame;

a wheel set having an axle, attached to the frame and generally drivable by the power drive unit;

a power source; and a speed control unit in communication with the power drive unit.

2. The adapter unit of claim 1, wherein the lower clamping mechanism can pivot.

3. The adapter unit of claim 2, wherein said vertical and lower arms are attached pivotally.

4. The adapter unit of claim 1, which includes a power drive unit controller in communication with the speed control unit and the power drive unit, which is mounted with a member which is pivotally attached to the vertical arm.

5. The adapter unit of claim 1, wherein said speed control unit can be clamped to a handle of the cart frame of the golf club bag pull cart.

6. The adapter of claim 5, wherein the lower clamping mechanism includes a generally C-shaped frame through an arm of which a tightening screw threadingly passes.

7. The adapter of claim 6, wherein a generally square U-bolt and two-screw assembly is employed to secure the cart frame of the golf club bag pull cart to the vertical arm by passing of the U-bolt through holes in the vertical arm.

8. The adapter of claim 7, wherein surfaces intended to be in contact with the golf club bag pull cart are rubberized.

9. The adapter of claim 1, wherein power to drive the power drive unit and wheels is supplied by electricity.

10. In combination, the adapter unit of claim 1, and, attached thereto through said upper and lower clamping mechanisms, a golf club bag pull cart having a frame, said upper and lower clamping mechanisms being attached to the frame, which provides a power assisted golf club bag cart.

11. The combination of claim 10, wherein the golf club bag pull cart has a generally square or rectangular frame.

12. An electric motor power assisted pull cart adapter unit useful for converting a standard golf club bag pull cart into a motor power assisted golf club bag cart, said unit comprising a frame including a vertical arm having upper and lower ends; a set of intermediate member(s) attached about the lower end of the vertical arm, which extend generally normal to the vertical arm; and pivotally attached to the set of intermediate member(s) a lower arm having a proximal end which is so attached to the set of intermediate member(s) and also having a distal end; an upper clamping mechanism for securing an upper portion of a frame of the golf club bag pull cart, which is attached about the upper end of the vertical arm; a lower clamping mechanism for securing a lower portion of the frame of the golf club bag pull cart, which is attached about the distal end of the lower arm and which can pivot with respect to the lower arm;

an electrical power drive unit attached to the vertical arm;

a wheel set having an axle, attached to the vertical arm about its lower end, and generally drivable by the electrical power drive unit;

an electrical power source;

a speed control unit in communication with the electrical power drive unit; and an electrical power drive unit controller in communication with the speed control unit and electrical the power drive unit.

13. The adapter unit of claim 12, wherein said vertical and lower arms are made from square tube stock.

14. The adapter unit of claim 13, wherein a generally square U-bolt and two-screw assembly is employed to secure a frame of the golf club bag pull cart to the vertical arm by passing of the U-bolt through holes in the vertical arm; the wheel set can be engaged or disengaged from being driven by the electrical power drive unit, while the wheel set remains on the axle and attached to the vertical arm; said speed control unit can be clamped to a handle of the cart frame of the golf club bag pull cart, through employment of a generally C-shaped frame through an arm of which a tightening screw threadingly passes; the electrical power drive unit controller is mounted with a member which is pivotally attached to the vertical arm; the lower clamping mechanism includes a generally C-shaped frame through an arm of which a tightening screw threadingly passes; and surfaces intended to be in contact with the golf club bag pull cart have a surface which can minimize scratching of the golf club bag pull cart frame.

15. The adapter of claim 14, wherein the electrical power is supplied by a battery, which can rest on the lower arm.

16. The adapter of claim 15, wherein said speed control unit has indicia for displaying power available in the battery.

17. In combination, the adapter unit of claim 12, and, attached thereto through said upper and lower clamping mechanisms, a golf club bag pull cart having a frame, said upper and lower clamping mechanisms being attached to the frame, which provides a motor power assisted golf club bag cart.

18. In combination, the adapter unit of claim 13, and, attached thereto through said upper and lower clamping mechanisms, a golf club bag pull cart having a frame, said upper and lower clamping mechanisms being attached to the frame, which provides a motor power assisted golf club bag cart.

19. In combination, the adapter unit of claim 14, and, attached thereto through said upper and lower clamping mechanisms, a golf club bag pull cart having a frame, said upper and lower clamping mechanisms being attached to the frame, which provides a motor power assisted golf club bag cart.

20. In combination, the adapter unit of claim 15, and, attached thereto through said upper and lower clamping mechanisms, a golf club bag pull cart having a frame, said upper and lower clamping mechanisms being attached to the frame, which provides a motor power assisted golf club bag cart.

* * * * *